July 21, 1970     F. S. ALLINQUANT     3,521,321

MEAT TENDERISING MACHINE

Filed May 8, 1968     5 Sheets-Sheet 3

INVENTOR
FERNAND STANISLAS ALLINQUANT
BY
Crumpston, Shaw & Stephens
ATTORNEYS

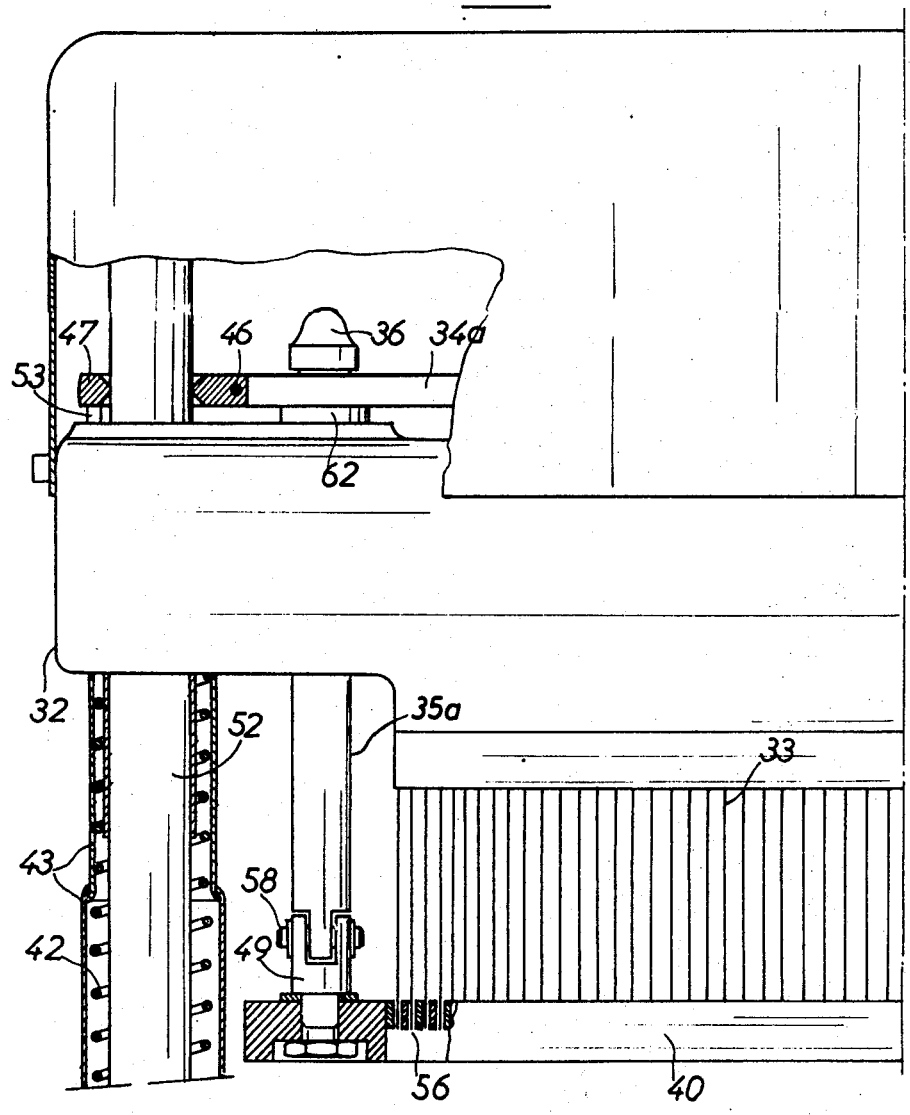
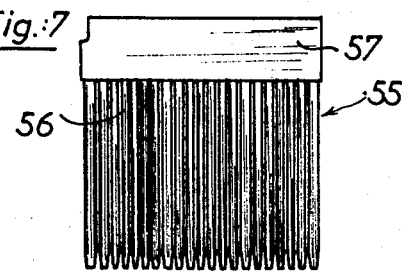

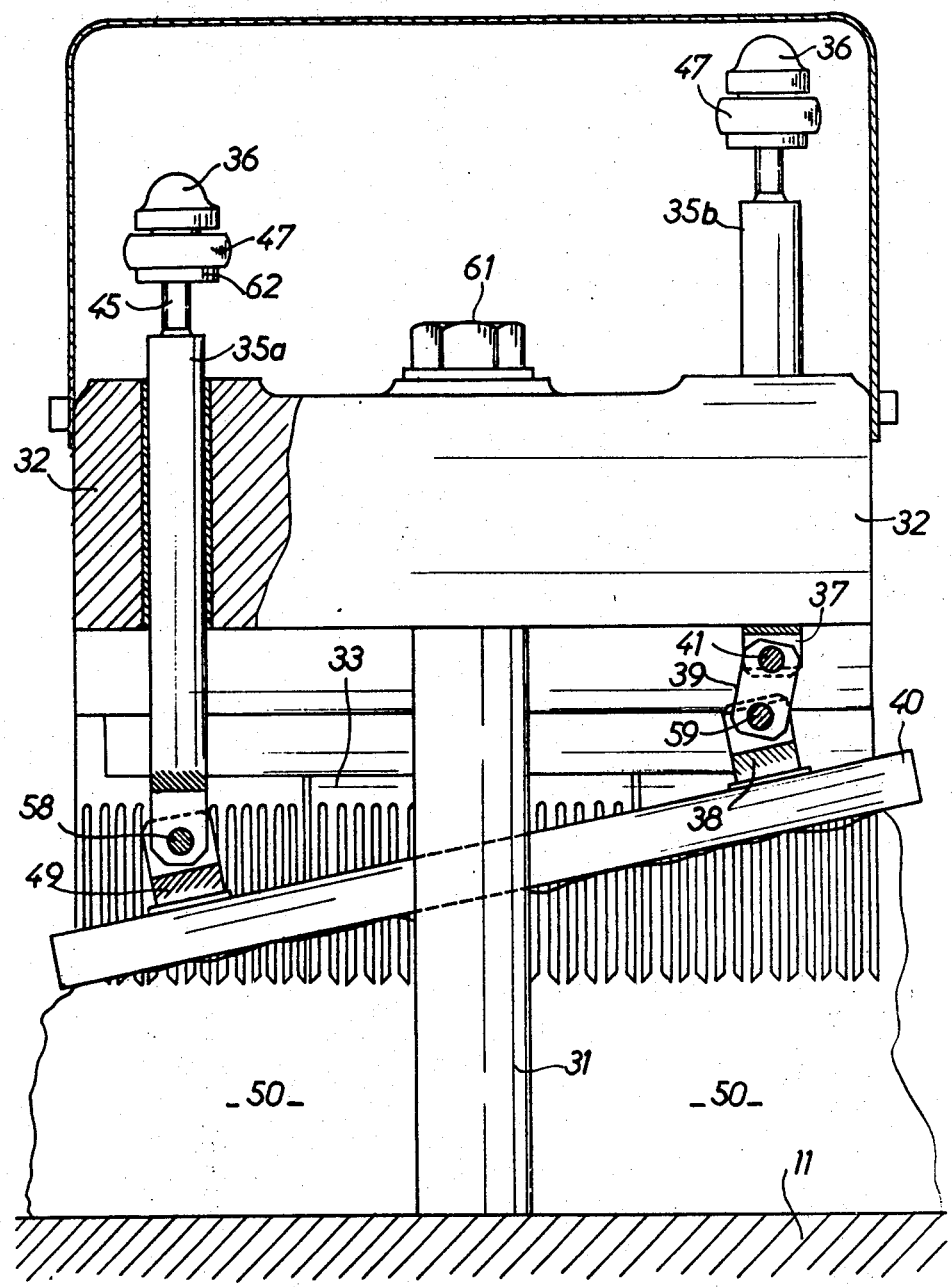

United States Patent Office 3,521,321
Patented July 21, 1970

3,521,321
MEAT TENDERISING MACHINE
Fernand Stanislas Allinquant, 53 Avenue Le Notre,
92 Sceaux, France
Filed May 8, 1968, Ser. No. 727,498
Claims priority, application France, May 9, 1967,
105,766
Int. Cl. A22c 9/00
U.S. Cl. 17—25                                4 Claims

ABSTRACT OF THE DISCLOSURE

The invention relates to a meat tenderising machine in which a piece of meat may be placed on a stationary table, a substantially horizontal grid connected to and supported by vertical rods and made of parallel bars is allowed to press upon the piece of meat, and a block of vertical blade plates each of which passes between two successive bars may be lowered so that the blades can penetrate into the piece of meat. According to the invention, the grid is connected to the supporting rods through deformable linking means. It can therefore tilt about the horizontal and assume a position corresponding to the shape of the piece of meat, in which no large portion of any blade lies unprotected between the grid and the piece of meat.

---

Figure 1:
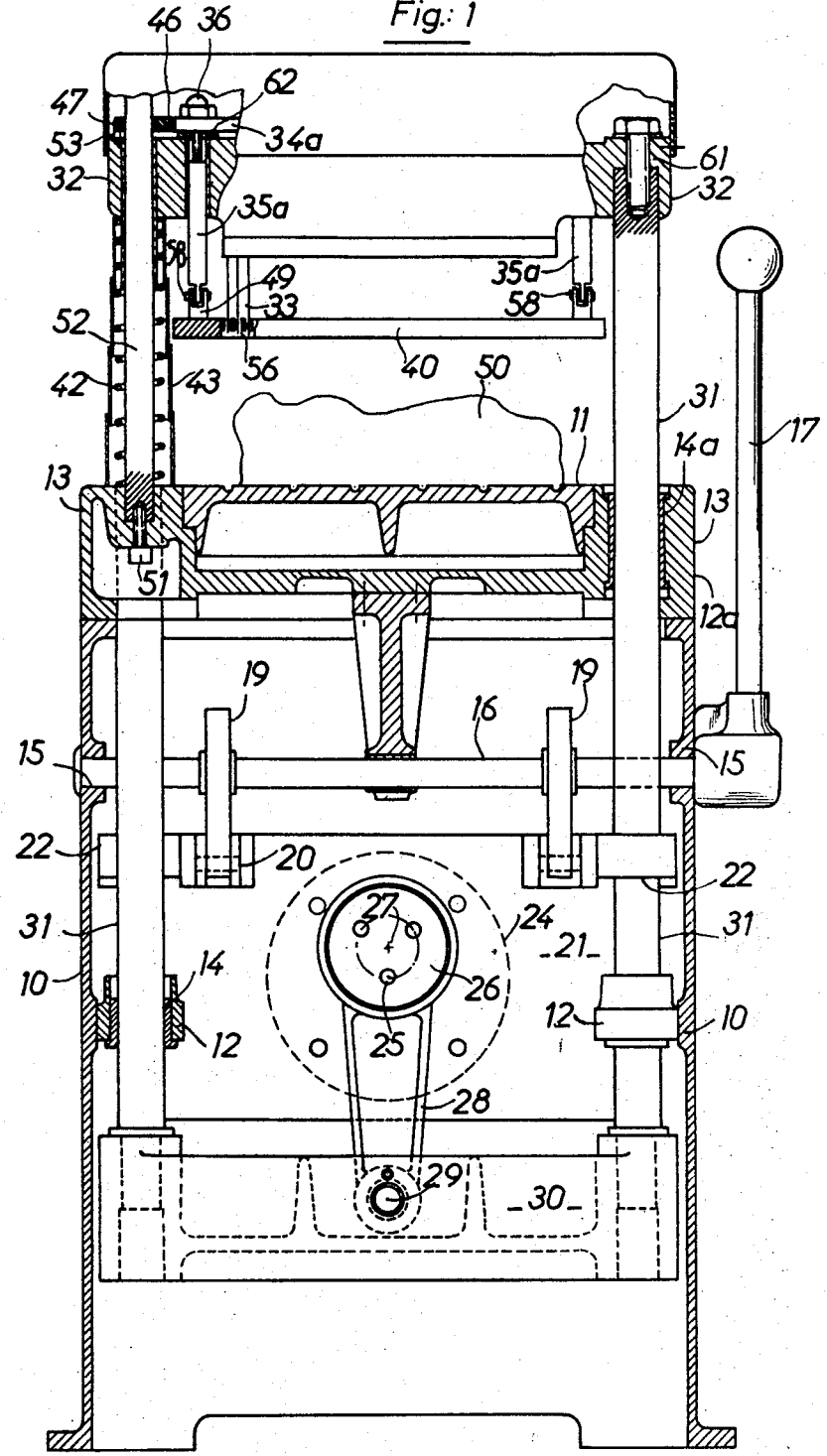

The present invention relates to improvements in a known meat tenderising machine comprising the following elements: a fixed frame comprising a horizontal meat-carrying plate and two vertical cylindrical guide columns; a horizontal cross-member which is provided with two principal vertical bores through which the columns pass and two secondary vertical bores is adapted to descend relative to the columns while being guided by them, and carries on its lower face descending vertical blade plates a sliding support consisting of at least; two vertical rods passing respectively through the two secondary bores each carrying at its top end a cap resting on the cross-member, and which carry at their bottom end a horizontal grid comprising parallel bars situated between the blade plates; and means for lowering the cross-member, the sliding support consisting of the rods and the grid relative to the fixed frame in a first movement until the grid is stopped by a piece of meat carried by the horizontal plate, then the cross-member alone in a second movement.

For using this machine, the cross-member and grid are first of all placed in their highest position relative to the fixed frame. The piece of meat to be tenderised is placed on the horizontal meat-carrying plate. In a first movement, the cross-member is lowered. It carries with it the rods, the heads of which rest on the cross-member, and the grid which is fixed to the rods. This first movement terminates when the grid is stopped by the piece of meat carried by the horizontal plate. In a second movement, the cross-member is lowered relative to the grid. The blades carried by the cross-member penetrate the piece of meat and tenderise it. The cross-member carrying the blade plates, and then the grid are lifted in succession. It is then possible to remove the piece of tenderised meat.

In this known machine, the grid is rigidly connected to the sliding support formed by the rods, so that when the grid moves it remains parallel to itself, namely horizontal. The upper surface of the piece of meat to be tenderised may differ considerably from a horizontal surface, and may approach, for example a highly oblique surface. Consequently, when by the first movement, the grid has been lowered until it has come into contact with the meat, there may be a considerable gap between the grid and certain parts of the meat surface, and when by the second movement the blades have been caused to penetrate the piece of meat, the same gap exists along some of the blades. The blades are fragile, and this gap may result in damage to them.

According to the invention, the grid is connected to its sliding support by deformable linking means, so that it can pivot about an axis perpendicular to the planes of the blade plates and to the grid bars.

With this arrangement, the grid is no longer rigidly connected to the rods, it assumes an oblique position adapted to the upper surface of the meat to be tenderised, and there no longer exists along a considerable part of any of the blades a gap between the grid and piece of meat, such that the blades can no longer be damaged.

The following description with reference to the accompanying drawings given by way of non-restrictive example will make it clear how the invention may be put into practice, the features following from both drawings and text forming, of course, part of the said invention.

The embodiment example which will be described is that of a relatively large machine. In this machine, the cross-member is provided with two other secondary bores, through which pass two other rods, and the machine is symmetrical relative to a central vertical plane perpendicular to the blade plates and to the bars.

Figure 2:
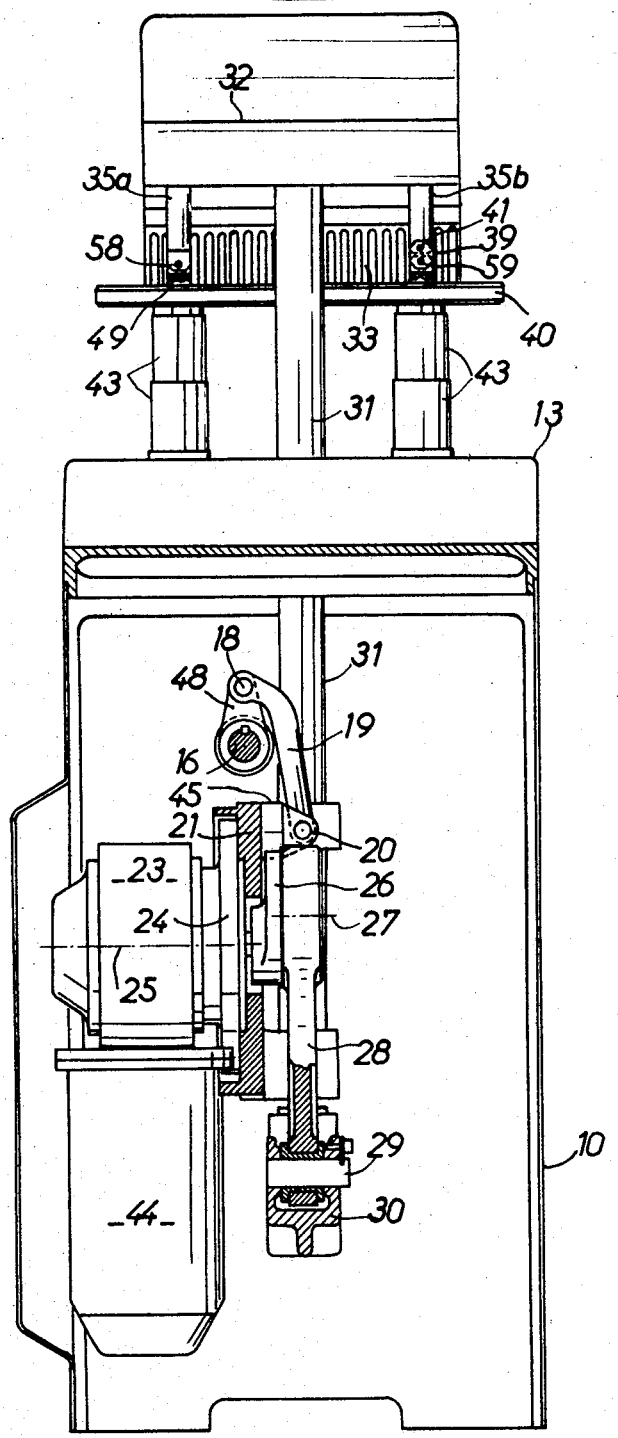
Figure 3:
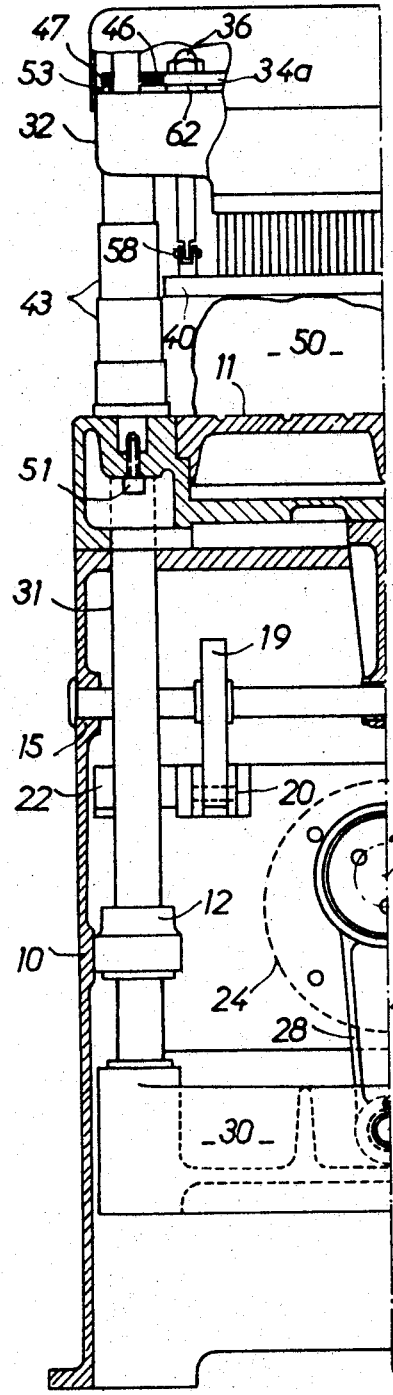
Figure 4:
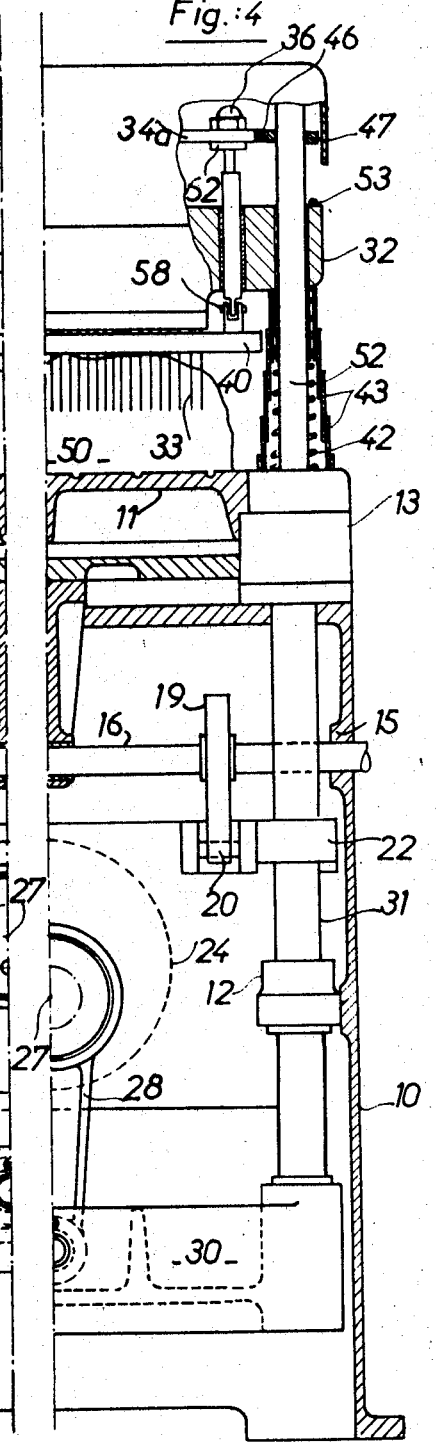

In the accompanying drawings, the figures show:

FIG. 1, a front elevation with partial section on different frontal planes of the machine according to the invention;

FIG. 2, a side elevation, with partial section, of the same machine, the top and bottom parts of the figure representing two different supporting columns, one behind and the other in front of the section plane;

FIGS. 3 and 4, a half front elevation with partial section of the machine according to the invention for two different positions of the cross-member;

FIG. 5, a front elevation with partial section and on a larger scale of part of the machine according to the invention;

FIG. 6, a side elevation with partial section, and on the same scale as FIG. 5, of the part of the machine shown in FIG. 5, except for the guide columns, which have not been shown; moreover the members are in a working position different from that shown in FIG. 5;

FIG. 7, a front view of the assembly of bars forming part of the grid.

In these drawings, 10 denotes a fixed frame having a substantially rectangular base and supporting a horizontal meat-carrying plate 11 and a cross-member 13. The fixed frame comprises internally, in the vicinity of the centre of two of its opposite faces, lower cylindrical sleeves 12, and the cross-member 13 comprises two sleeves 12a situated respectively above the two sleeves 12. Each sleeve 12 and 12a encloses a liner 14 and 14a, respectively. The frame 10 has a bearing 15 on each of the two same opposite faces which carry the sleeves 12. These two faces are the two lateral faces of the machine. The two other faces are the two frontal faces, respectively front, before which stands the user, and rear. The cross-member 13, in the vicinity of its four corners, carries four guide columns 52.

The two bearings 15 carry a shaft 16, on one end of which an operating lever 17 is mounted outside of the frame 10. The shaft 16 carries two cranks 48. Two connecting rods 19 are each pivoted by its top end 18 to a crank 48 and by its bottom end 20 to a horizontal bar 45 carried by a vertical stay plate 21. The plate 21 carries a motor 44 which, by means of a speed reducer 23, rotates a circular plate 24 on its axis 25. Mounted in the circular plate 24 is an eccentric plate 26 having its axis at 27 and carrying a connecting rod 28 pivoted by its bottom end 29 to a lower horizontal cross-member 30.

Rigidly connected to this lower cross-member 30 are two vertical supporting columns 31 passing through the sleeves 14 and 14a. The two columns 31 are rigidly connected by their top end, by means of screws 61, to an upper horizontal cross-member 32, carrying on its lower face descending vertical blade plates 33. Compression springs 42, protected by telescopic tubes 43, return the cross-member 32 to its upper position.

The cross-member 32 is provided with four principal vertical bores through which pass the four guide columns 52, and with four secondary vertical bores through which pass the four rods 35a and 35b mentioned below. Each secondary bore is situated in the vicinity of a principal bore, the centres of the circular horizontal sections of the secondary bores are the corners of a rectangle, a same vertical frontal plane contains the axes of the two front principal bores and the axes of the two front secondary bores, and similarly a same rear frontal vertical plane contains the axes of the two rear principal bores and the axes of the two rear secondary bores. Two front and rear frontal horizontal bars 34a and 34b rest by means of washers 62 on the cross-member 32, and through each of them passes, in the vicinity of their ends, a lateral pin 46 on which is adapted to rotate a ring 47 surrounding the adjacent guide column 52 and adapted to rest on a stud 53 carried by the cross-member 32. A vertical front rod 35a or rear rod 35b passes through each of the secondary bores and terminates in its upper part in a cap 36 resting on the horizontal bar 34a or 34b and consequently also, by means of the bars 34a and 34b and washers 62, on the cross-member 32. By means of which will be described hereafter and forming an improvement according to the invention, the rods 35a and 35b on their lower part carry the frame 40 of a grid 55 comprising parallel bars 56 carried by a rail 57. The grid is oriented in the direction for which the blade plates 33 are able to pass between the bars 56, i.e. the bars 56 are parallel to the blade plates. In the drawings, the grids and the blades are perpendicular to plane of FIGS. 1, 3, 4 and 5 and parallel to the plane of FIGS. 2 and 6. The two front rods 35a each carry a horizontal hinge pin 58 perpendicular to the blade plates 33 and to the bars 56, and the frame 40 of the grid carries two lugs 49 each pivoted on a pin 58. The frame 40 of the grid also carries two brackets 38, arranged in the same rear frontal plane, each rear rod 35b also carries a bracket 37, and two pivot pins 59 and 41, perpendicular to the blade plates 33 and to the bars 34 of the grid, pass through the brackets and a link 39.

The machine functions as follows:

The lever 17 is first of all in its vertical position shown in FIG. 1, so that the supporting columns 31 occupy their highest position shown in FIGS. 1 and 2. The piece of meat 50 to be tenderised is placed in position on the plate 11. The arm 17 is lowered and by means of the following parts causes the cross-member 32 to descend in a first downward movement: cranks 48, connecting rods 19, bar 45, stay plate 21, motor 44, speed reducer 24, eccentric 26, connecting rod 28, lower cross-member 30 and supporting columns 31. Driven by their weight, the bars 34a and 34b, rings 47, rods 35a and 35b, frame 40 of the grid 55 also descend. This movement continues until the grid 55 comes into contact with the piece of meat 50 to be tenderised. Due to its link connections, the frame 40 of the grid assumes the position shown in FIG. 6, which corresponds to that of the upper surface of the piece of meat. The machine then shows the configuration shown in FIG. 3.

The motor 44 is then started. By means of the eccentric 26 and the connecting rod 28, its rotation lowers still further the lower cross-member 30, and with it the supporting columns 31, the upper cross-member 32 and the blade plates, the blades penetrate the piece of meat to be tenderised and occupy the position shown in FIGS. 4 and 6. As will be seen, at least with the piece of meat 50 shown in the figures, no appreciable part of any blade is free between the grid and the piece of meat. These blades are, therefore, well protected. When the rotation of the motor 44 continues, the blades ascend while moving out of the piece of meat. They tend to carry with them the piece of meat, which in its turn bears against the grid and tends to lift it, but, as shown in FIG. 4, each ring 47 is inclined on its pin 46, it jams against the corresponding guide column 52, and thus keeps the grid in place and the machine re-assumes its configuration shown in FIG. 3.

Finally, the lever 17 is returned to its original vertical position shown in FIG. 1. The cross-member 32 is caused to re-ascend by means of the parts 16, 19, 45, 21, 44, 24, 26, 28, 30 and 31. By means of the studs 53, the cross-member 32 rests on the rings 47, and gives them a horizontal position in which they no longer rub against the columns 52, and the cross-member 32 may therefore continue to ascend, pushing in front of it the bars 34a and 34b carrying the rods 35a and 35b and the grid 55. The machine then re-assumes its starting position shown in FIGS. 1 and 2.

I claim:

1. Meat tenderising machine comprising a meat-carrying plate for receiving a piece of meat to be tenderised, a reciprocating supporting member reciprocating with respect to said plate, blade plates parallel to one another, perpendicular to said plate and secured to said reciprocating supporting member, a grid having parallel bars extending between the blade plates, supporting means for supporting this grid, said grid supporting means being slid-rods parallel with the blade plates and adapted to slide able with respect to said reciprocating supporting member, and deformable linking means for linking said grid supporting means with said grid, said deformable linking means being adapted for enabling said grid to rotate about an axis perpendicular to the planes of said blade plates and to said grid bars.

2. A meat tenderising machine according to claim 1, wherein said grid supporting means comprise at least two rods parallel with the blade plates and adapted to slide in said reciprocating supporting member, said grid being linked to one of said rods at one end thereof about an axis perpendicular to the planes of the blade plates and to the grid bars and being connected to the other rod through a link.

3. A meat tenderising machine according to claim 1, wherein said grid supporting means comprise four rods adapted to slide in said reciprocating supporting member and are two by two in planes parallel and perpendicular to the planes of the blade plates respectively, said grid being linked to two rods defining a plane perpendicular to the planes of the blade plates about an axis also perpendicular to these planes and being connected by a link to the other two rods.

4. A meat tenderising machine according to claim 1 comprising means for preventing said grid to move along with said reciprocating supporting member in that stroke of said reciprocating supporting member in which it moves away from said meat-carrying plate.

References Cited

UNITED STATES PATENTS

| | | | |
|---|---|---|---|
| 1,986,074 | 1/1935 | Spang | 17—25 |
| 2,069,696 | 2/1937 | Burk. | |
| 2,239,430 | 4/1941 | Spang | 17—25 |
| 2,688,151 | 9/1954 | Komarik et al. | 17—25 |
| 3,283,360 | 11/1966 | Tamin | 17—25 |

LUCIE H. LAUDENSLAGER, Primary Examiner